US012692333B2

(12) United States Patent
Itoi et al.

(10) Patent No.: US 12,692,333 B2
(45) Date of Patent: *Jul. 28, 2026

(54) DISPERSANT FOR POWER STORAGE DEVICE POSITIVE ELECTRODE

(71) Applicant: Kao Corporation, Tokyo (JP)

(72) Inventors: Akito Itoi, Wakayama (JP); Yutaro Kinoshita, Wakayama (JP); Kyoichi Shirota, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/289,683

(22) PCT Filed: Apr. 28, 2022

(86) PCT No.: PCT/JP2022/019385
§ 371 (c)(1),
(2) Date: Nov. 6, 2023

(87) PCT Pub. No.: WO2022/234827
PCT Pub. Date: Nov. 10, 2022

(65) Prior Publication Data
US 2024/0247088 A1 Jul. 25, 2024

(30) Foreign Application Priority Data

May 6, 2021 (JP) ................................. 2021-078723

(51) Int. Cl.
| | |
|---|---|
| *H01M 4/62* | (2006.01) |
| *C08F 220/18* | (2006.01) |
| *C08F 220/48* | (2006.01) |
| *C09D 5/24* | (2006.01) |
| *C09D 7/45* | (2018.01) |
| *C09D 7/61* | (2018.01) |
| *C09D 7/65* | (2018.01) |

(52) U.S. Cl.
CPC ...... *C08F 220/1818* (2020.02); *C08F 220/48* (2013.01); *C09D 5/24* (2013.01); *C09D 7/45* (2018.01); *C09D 7/61* (2018.01); *C09D 7/65* (2018.01); *H01M 4/62* (2013.01); *H01M 4/625* (2013.01); *C08F 2800/20* (2013.01)

(58) Field of Classification Search
CPC ......... C08F 220/1818; C08F 220/1808; C08F 220/1809; C08F 220/1811; C08F 220/1812; C08F 220/48; C09D 7/65; C09D 7/48; C09D 5/24; H01M 4/62; H01M 4/625
See application file for complete search history.

(56) References Cited

U.S. PATENT DOCUMENTS

| | | | |
|---|---|---|---|
| 3,255,135 A * | 6/1966 | Schmidle | C08F 2/08 526/254 |
| 6,117,937 A | 9/2000 | Matsumoto et al. | |
| 2015/0028264 A1* | 1/2015 | Kuwahara | H01M 4/623 252/506 |

(Continued)

FOREIGN PATENT DOCUMENTS

| | | |
|---|---|---|
| CN | 108598486 A | 9/2018 |
| EP | 4228035 A1 | 8/2023 |

(Continued)

OTHER PUBLICATIONS

International Search Report, issued in PCT/JP2022/019385, PCT/ISA/210, dated Jul. 12, 2022.

(Continued)

*Primary Examiner* — Haidung D Nguyen
(74) *Attorney, Agent, or Firm* — Birch, Stewart, Kolasch & Birch, LLP

(57) ABSTRACT

An aspect of the present disclosure relates to a dispersant for a positive electrode of a power storage device, the dispersant being a copolymer containing a constitutional unit represented by the following formula (1), a constitutional unit represented by the following formula (2), and a constitutional unit represented by the following formula (3). Also, an aspect of the present disclosure relates to a dispersant composition, a conductive material slurry for a battery and a method for producing the conductive material slurry a positive electrode paste for a battery or a positive electrode for a battery, each of which contains the dispersant for a positive electrode of a power storage device.

$$
\begin{array}{c}
R^1 \quad R^3 \\
| \qquad | \\
-(C\!-\!C)- \\
| \qquad | \\
R^2 \quad C\!=\!O \\
\qquad | \\
\qquad O\!-\!R^4
\end{array}
\tag{1}
$$

$$
\begin{array}{c}
R^5 \quad R^7 \\
| \qquad | \\
-(C\!-\!C)- \\
| \qquad | \\
R^6 \quad X^1
\end{array}
\tag{2}
$$

$$
\begin{array}{c}
R^8 \quad R^{10} \\
| \qquad | \\
-(C\!-\!C)- \\
| \qquad | \\
R^9 \quad C\!=\!O \\
\qquad | \\
\qquad NH_2
\end{array}
\tag{3}
$$

11 Claims, No Drawings

(56)         References Cited

U.S. PATENT DOCUMENTS

| | | |
|---|---|---|
| 2017/0301949 A1 | 10/2017 | Mimura et al. |
| 2022/0173403 A1 | 6/2022 | Itoi et al. |
| 2022/0177691 A1 | 6/2022 | Kinoshita et al. |

FOREIGN PATENT DOCUMENTS

| | | |
|---|---|---|
| JP | 2014-137916 A | 7/2014 |
| JP | 2014-203555 A | 10/2014 |
| JP | 2018-170218 A | 11/2018 |
| JP | 2021-163626 A | 10/2021 |
| JP | 2022-63854 A | 4/2022 |
| WO | WO 2013/151062 A1 | 10/2013 |
| WO | WO 2016/129426 A1 | 8/2016 |
| WO | WO 2020/208799 A1 | 10/2020 |
| WO | WO 2020/208880 A1 | 10/2020 |
| WO | WO 2020/208881 A1 | 10/2020 |
| WO | WO 2022/080206 A1 | 4/2022 |

OTHER PUBLICATIONS

Notice of Reasons for Refusal for Japanese Application No. 2021-078723, mailed on Feb. 7, 2023.
Extended European Search Report for European Application No. 22798931.6, dated Apr. 25, 2025.

\* cited by examiner

DISPERSANT FOR POWER STORAGE DEVICE POSITIVE ELECTRODE

TECHNICAL FIELD

The present invention relates to a dispersant for a positive electrode of a power storage device.

BACKGROUND ART

In recent years, efforts to curb global warming have spurred the development of electric vehicles. Electric vehicles do not emit carbon dioxide, but have short mileage and long battery charging time, compared to gasoline-powered vehicles. To reduce the charging time, the rate of electron transfer in a positive electrode should be increased. At present, a carbon material is used as a conductive assistant (conductive material) for a positive electrode of a non-aqueous electrolyte battery. It is important for the conductive material to have favorable dispersibility in a conductive material slurry in which the conductive material is dispersed in an organic solvent in order to form a favorable conductive path in the positive electrode.

WO 2020/208880 A1 (Patent Document 1) discloses that carbon nanotubes (CNTs) are used as a conductive material, and a specific copolymer such as a copolymer of stearyl methacrylate (SMA) and 2-hydroxyethyl methacrylate (HEMA) is added in order to highly disperse CNTs in a conductive material slurry. Also, a copolymer of SMA, HEMA and methacrylamide (MAAm) is disclosed in Examples.

JP 2018-170218 A (Patent Document 2) discloses that a specific copolymer such as a copolymer of stearyl methacrylate (SMA), methoxypolyethylene glycol methacrylate (PEG(2)MA), and methacrylamide (MAAm) is added as a dispersant because, when a dispersant contained in a positive electrode paste is highly soluble in an electrolyte solution, a separator will be clogged by the copolymer eluted in the electrolyte solution, resulting in an increase in resistance.

Also, JP 2014-137916A (Patent Document 3) discloses a conductive adhesive composition for an electrochemical element electrode that contains a dispersion medium and a particulate binder that includes a constitutional unit derived from acrylonitrile (AN) and a constitutional unit derived from lauryl acrylate in order to improve cycle properties even when an active material for high potential is used. It is also discloses that the conductive adhesive composition for an electrochemical element electrode is used to form a conductive adhesive layer provided between an electrode active material layer and a current collector.

DISCLOSURE OF INVENTION

Means for Solving Problem

An aspect of the present disclosure relates to a dispersant for a positive electrode of a power storage device, the dispersant being a copolymer containing a constitutional unit represented by the following formula (1), a constitutional unit represented by the following formula (2), and a constitutional unit represented by the following formula (3).

[Chemical Formula 1]

$$
\begin{array}{c}
\text{(1)}\\
\end{array}
$$

In the formula (1), $R^1$, $R^2$, and $R^3$ are the same or different and represent a hydrogen atom, a methyl group, or an ethyl group, and $R^4$ represents a hydrocarbon group having 8 to 30 carbon atoms.

[Chemical Formula 2]

$$
\begin{array}{c}
\text{(2)}\\
\end{array}
$$

In the formula (2), $R^5$, $R^6$, and $R^7$ are the same or different and represent a hydrogen atom, a methyl group, or an ethyl group, and a functional group $X^1$ is a functional group contained in a monomer unit of a homopolymer that is represented by the formula (2) and is adsorbed on a carbon material-based conductive material at an adsorption percentage of 10.0% or more.

[Chemical Formula 3]

$$
\begin{array}{c}
\text{(3)}\\
\end{array}
$$

In the formula (3), $R^8$, $R^9$, and $R^{10}$ are the same or different and represent a hydrogen atom, a methyl group, or an ethyl group.

An aspect of the present disclosure relates to a dispersant for a positive electrode of a power storage device, the dispersant being a copolymer containing a constitutional unit represented by the following formula (1), a constitutional unit represented by the following formula (2), and a constitutional unit represented by the following formula (3).

[Chemical Formula 4]

$$
\begin{array}{c}
\text{(1)}\\
\end{array}
$$

In the formula (1), $R^1$, $R^2$, and $R^3$ are the same or different and represent a hydrogen atom, a methyl group, or an ethyl group, and $R^1$ represents a hydrocarbon group having 8 to 30 carbon atoms.

[Chemical Formula 5]

$$\begin{array}{ccc} & R^5 & R^7 \\ & | & | \\ -(C & \quad\quad C)- \\ & | & | \\ & R^6 & X^1 \end{array} \quad (2)$$

In the formula (2). $R^5$, $R^6$, and $R^7$ are the same or different and represent a hydrogen atom, a methyl group, or an ethyl group, and a functional group $X^1$ is a pyridinyl group, a pyrrolidone group, or a cyano group that may have a hydrocarbon group having 1 to 4 carbon atoms.

[Chemical Formula 6]

$$\begin{array}{ccc} & R^8 & R^{10} \\ & | & | \\ -(C & \quad\quad C)- \\ & | & | \\ & R^9 & C=O \\ & & | \\ & & NH_2 \end{array} \quad (3)$$

In the formula (3), $R^8$, $R^9$, and $R^{10}$ are the same or different and represent a hydrogen atom, a methyl group, or an ethyl group.

An aspect of the present disclosure relates to a dispersant composition that contains the dispersant for a positive electrode of a power storage device according to the present disclosure and a solvent.

An aspect of the present disclosure relates to a conductive material slurry for a battery that contains the dispersant for a positive electrode of a power storage device according to the present disclosure, a carbon material-based conductive material, and a solvent.

An aspect of the present disclosure relates to a method for producing a conductive material slurry for a battery, the method including dispersing components in a mixture containing the dispersant for a positive electrode of a power storage device according to the present disclosure, a conductive material, and a solvent, using a medium stirring type dispersing machine.

An aspect of the present disclosure relates to a positive electrode paste for a battery that contains the dispersant for a positive electrode of a power storage device according to the present disclosure, a carbon material-based conductive material, a positive electrode active material, a binder, and a solvent.

An aspect of the present disclosure relates to a positive electrode for a battery that contains the dispersant for a positive electrode of a power storage device according to the present disclosure.

DESCRIPTION OF THE INVENTION

However, even if the dispersant disclosed in Patent Document 1 or 2 is used, there is a problem that the viscosity of a slurry increases as the temperature of the slurry increases in the process of dispersing the carbon material-based conductive materials into a dispersion solvent. When the temperature of a slurry increases and the viscosity of the slurry increases and the dispersion efficiency decreases and the defibration of a carbon material-based conductive material such as CNTs does not progress, and its resistance value increases. Therefore, when a slurry is prepared, the dispersion efficiency needs to be improved by reducing its viscosity using a method of adding additional solvent or the like.

In view of this, an aspect of the present disclosure provides a dispersant for a positive electrode of a power storage device that has low solubility in an electrolyte solution, suppresses an increase in viscosity even when the temperature of the slurry increases in the process of dispersing carbon material-based conductive materials, and enables the production of a conductive material slurry for a battery that has low viscosity and favorable handleability during slurry preparation. Also, an aspect of the present disclosure provides a dispersant composition, a conductive material slurry for a battery and a method for producing the conductive material slurry, a positive electrode paste for a battery, or a positive electrode for a battery, each of which contains the dispersant for a positive electrode of a power storage device.

As described above, the dispersants disclosed in Patent Documents 1 and 2 have the problem of thickening during the process of dispersing the carbon material-based conductive materials (may also be abbreviated to "conductive materials" hereinafter) in a dispersion solvent. This is because the temperature of the slurry increases over time in the process of dispersing the conductive material in the dispersion solvent. Specifically when dispersion treatment is performed using a medium stirring type dispersing machine, a strong shear force is generated between media and heat is generated. When the temperature of the slurry increases, the adsorption performance of the dispersant (copolymer) to the conductive materials cannot be sufficiently ensured, and dispersion does not progress. For example, when the dispersion treatment is performed on a liquid at 25° C. using a medium stirring type dispersing machine, the temperature of the resulting slurry at the outlet of the dispersing machine reaches 50° C.

The present disclosure is based on the new findings that, by introducing a specific functional group into the constitutional unit of the dispersant, thickening is suppressed even when the slurry temperature described above reaches, for example, 50° C.

[Dispersant for Positive Electrode of Power Storage Device]

An aspect of the present disclosure relates to a dispersant for a positive electrode of a power storage device (may also be abbreviated as a "dispersant" or "dispersant A" hereinafter), the dispersant being a copolymer that contains a constitutional unit represented by the following formula (1) (may be referred to as a "constitutional unit a" hereinafter), a constitutional unit represented by the following formula (2) (may be referred to as a "constitutional unit b" hereinafter), and a constitutional unit represented by the following formula (3) (may be referred to as a "constitutional unit c" hereinafter).

[Chemical Formula 7]

$$\begin{array}{ccc} & R^1 & R^3 \\ & | & | \\ -(C & \quad\quad C)- \\ & | & | \\ & R^2 & C=O \\ & & | \\ & & O-R^4 \end{array} \quad (1)$$

5

6

In the formula (1), $R^1$, $R^2$, and $R^3$ are the same or different and represent a hydrogen atom, a methyl group, or an ethyl group, and $R^4$ represents a hydrocarbon group having 8 to 30 carbon atoms.

[Chemical Formula 8]

$$
\begin{array}{cc}
R^5 & R^7 \\
| & | \\
-\!\!\!-(C\!\!-\!\!\!-\!\!\!-\!\!\!-\!\!\!-\!\!C\!\!\,)\!\!\!- \\
| & | \\
R^6 & X^1
\end{array}
\tag{2}
$$

In the formula (2), $R^5$, $R^6$, and $R^7$ are the same or different and represent a hydrogen atom, a methyl group, or an ethyl group, and a functional group $X^1$ is a functional group contained in a monomer unit of a homopolymer that is represented by the formula (2) and is adsorbed on a carbon material-based conductive material at an adsorption percentage of 10.0% or more.

[Chemical Formula 9]

$$
\begin{array}{cc}
R^8 & R^{10} \\
| & | \\
-\!\!\!-(C\!\!-\!\!\!-\!\!\!-\!\!\!-\!\!\!-\!\!C\!\!\,)\!\!\!- \\
| & | \\
R^9 & C\!\!=\!\!O \\
& | \\
& NH_2
\end{array}
\tag{3}
$$

In the formula (3), $R^8$, $R^9$, and $R^{10}$ are the same or different and represent a hydrogen atom, a methyl group, or an ethyl group.

The details of the mechanism by which the dispersant of the present disclosure suppresses its dissolution to an electrolyte solution and thickening are not fully clear, but can be assumed as follows.

The constitutional unit a of the dispersant (A) of the present disclosure has a hydrocarbon group having 8 to 30 carbon atoms, the hydrocarbon group being a hydrophobic group, and thus is adsorbed on the carbon material-based conductive materials (may also be abbreviated as "conductive materials" hereinafter), exhibiting dispersibility. However, the adsorption force weakens as the molecular motion increases at a high temperature of 50° C. or more, for example, and thus the dispersibility of the conductive materials decreases. In contrast, the constitutional unit b contains the later-described functional group $X^1$. Therefore, the constitutional unit b is adsorbed on the conductive materials that cannot be not coated with the constitutional unit a, and also can maintain its adsorbed state even at a high temperature of 50° C. or more, for example. Thus, its dispersibility can be maintained with a decrease in the adsorption force of the constitutional unit a being compensated. Also, because the dispersant (A) contains the constitutional unit c, the dissolution of the dispersant (A) in the electrolyte solution can be suppressed. Therefore, the dispersant of the present disclosure contains the constitutional units a to c, and thus has low solubility in the electrolyte solution, suppresses an increase in viscosity even when the temperature of the slurry is high in the process of dispersing the carbon material-based conductive material, and can provide a conductive material slurry for a battery (may also be abbreviated as a "conductive material slurry" or "slurry" hereinafter) that has low viscosity and favorable handleability when preparing the slurry, and realizes favorable dispersion of the carbon material-based conductive materials, thus obtaining a low resistance value. However, the present disclosure should not be construed as being limited to these mechanisms.

An aspect of the present disclosure can provide a dispersant for a positive electrode of a power storage device that has low solubility in the electrolyte solution, suppresses an increase in viscosity even when the temperature of the slurry is high in the process of dispersing the carbon material-based conductive materials or the like, and can produce a conductive material slurry for a battery that has a low viscosity, favorable handleability when preparing the slurry, and realizes favorable dispersion of the carbon material-based conductive material, thus obtaining a low resistance value. Also, an aspect of the present disclosure can provide a dispersant composition, a conductive material slurry for a battery and a method for producing the conductive material slurry, a positive electrode paste for a battery, or a positive electrode for a battery, each of which contains the dispersant for a positive electrode of a power storage device.

<Constitutional Unit a>

The constitutional unit a contained in the dispersant of the present disclosure is a constitutional unit represented by the formula (1). The constitutional unit a may be of one type or a combination of two or more types. In the present disclosure, the constitutional unit a is a component of the copolymer of the present disclosure that is to be adsorbed on the surfaces of the conductive materials.

In one or more embodiments, examples of a monomer that forms the constitutional unit a (also referred to as a "monomer a" in the following) include the following: ester compounds such as 2-ethylhexyl (meth)acrylate, octyl (meth)acrylate, lauryl (meth)acrylate, stearyl (meth)acrylate, isostearyl (meth)acrylate, and behenyl (meth)acrylate; and amide compounds such as 2-ethylhexyl (meth)acrylamide, octyl (meth)acrylamide, lauryl (meth)acrylamide, stearyl (meth)acrylamide, and behenyl (meth)acrylamide. In particular, from the viewpoint of improving the dispersibility of the conductive materials and facilitating the introduction of the constitutional unit a into a dispersant (copolymer), the monomer a is preferably at least one selected from lauryl (meth)acrylate, stearyl (meth)acrylate, and behenyl (meth) acrylate, more preferably at least one selected from stearyl (meth)acrylate and behenyl (meth)acrylate, even more preferably at least one selected from stearyl methacrylate (SMA) and behenyl methacrylate (BeMA), and further preferably stearyl methacrylate.

The content of the constitutional unit a in all the constitutional units of the dispersant according to the present disclosure is preferably 10% by mass or more, more preferably 25% by mass or more, further preferably 35% by mass or more, and even more preferably 39% by mass or more from the viewpoint of improving the adsorbability of the dispersant on the surfaces of the conductive materials and improving the dispersibility of the conductive materials. From the same viewpoint, the content of the constitutional unit a is preferably 75% by mass or less, more preferably 55% by mass or less, further preferably 50% by mass or less, and even more preferably 45% by mass or less. From the same viewpoint, the content of the constitutional unit a in all the constitutional units of the dispersant according to the present disclosure is preferably 10% by mass to 75% by mass, more preferably 25% by mass to 55% by mass, further preferably 35% by mass to 55% by mass, even more preferably 39% by mass to 50% by mass, and still more preferably 39% by mass to 45% by mass. When the constitutional unit a is a combination of two or more types, the content of the constitutional unit a is the total content of the two or more types.

In the present disclosure, the content of the constitutional unit a in all the constitutional units of the dispersant can be considered as the ratio of the amount of the monomer a used to the total amount of the monomers used for polymerization.

<Constitutional Unit b>

The constitutional unit b contained in the dispersant of the present disclosure is a constitutional unit represented by the above formula (2). The constitutional unit b may be of one type or a combination of two or more types. In the present disclosure, the constitutional unit b is a component of the dispersant of the present disclosure that is stably adsorbed on the surface of the conductive material even at a high temperature, realizing effective dispersion performance.

In the formula (2), a functional group $X^1$ is a functional group contained in a monomer unit of a homopolymer that is represented by the formula (2) and is adsorbed on a carbon material-based conductive material at an adsorption percentage of 10.0% or more, and corresponds to a pyridinyl group, a pyrrolidone group, or a cyano group that may have a hydrocarbon group having 1 to 4 carbon atoms, for example.

The adsorption percentage of the homopolymer adsorbed on the conductive material can be obtained using the following method.

A mixture (a 1.0% by mass conductive material slurry) of a 1.0% by mass polymer solution, which is obtained by mixing 0.3 g of a homopolymer with 29.4 g of a solvent (NMP), and 0.3 g of a carbon material-based conductive material (CNT NC7000 manufactured by Nanocyl) is subjected to ultrasonic vibration for 1 minute, thus dissociating aggregates of the conductive material. The obtained aggregate-dissociated liquid is centrifuged at a rotational speed of 25000 rpm for 3 hours using a centrifuge (KUBUTA table-top high-speed cooling centrifuge 3K30C using rotor S12158), leading to sedimentation of the conductive material. A supernatant $W_1$ (g) is separated using a decantation method and dried at 140° C. for 12 hours. A measured weight $W_2$ (g) of the dried product obtained is regarded as the weight of a polymer that has not been adsorbed on the conductive material (non-adsorbed polymer weight). The adsorption percentage is calculated using the following formula, using the difference between the initial polymer weight (0.3 g) and the polymer weight as that of an adsorptive polymer.

$$\text{Adsorption percentage (\%)} = 1 - \left(\frac{W_2}{W_1}\right)\left(\frac{0.3}{29.7}\right) \qquad \text{[Math 1]}$$

A homopolymer constituted by a monomer that forms the constitutional unit b is adsorbed on the carbon material-based conductive material at an adsorption percentage of 10.0% or more, preferably 12.0% or more, more preferably 14.0% or more, and preferably 50.0% or less, more preferably 30.0% or less, further preferably 20.0% or less.

Specific examples of the monomer that forms the constitutional unit b (also referred to as a "monomer b" hereinafter) include methacrylonitrile (MeAN) (homopolymer adsorption percentage: 12.1%), acrylonitrile (AN) (homopolymer adsorption percentage: 14.8%), 4-vinylpyridine (4-Vpy) (homopolymer adsorption percentage: 18.5%), and 2-vinylpyridine (2-Vpy) (homopolymer adsorption percentage: 16.6%).

The content of the constitutional unit b in all the constitutional units of the dispersant according to the present disclosure is preferably 10% by mass or more, more preferably 20% by mass or more, and further preferably 24% by mass or more from the viewpoint of improving the adsorbability of the dispersant on the surfaces of the conductive materials and improving the dispersibility of the conductive materials at high temperatures. From the same viewpoint, the content of the constitutional unit b is preferably 70% by mass or less, more preferably 60% by mass or less, further preferably 45% by mass or less, and even more preferably 38% by mass or less. From the same viewpoint, the content of the constitutional unit b in all the constitutional units of the dispersant according to the present disclosure is preferably 10% by mass to 70% by mass, more preferably 10% by mass to 60% by mass, further preferably 20% by mass to 60% by mass, even more preferably 20% by mass to 45% by mass, still more preferably 24% by mass to 45% by mass, and yet more preferably 24% by mass to 38% by mass. When the constitutional unit b is a combination of two or more types, the content of the constitutional unit b is the total content of the two or more types.

In the present disclosure, the content of the constitutional unit b in all the constitutional units of the dispersant can be considered as the ratio of the amount of the monomer b used to the total amount of the monomers used for polymerization.

<Constitutional Unit c>

The constitutional unit c contained in the dispersant of the present disclosure is a constitutional unit represented by the formula (3) above. The dispersant of the present disclosure contains the constitutional unit c having an amide group on its side chain, and thus has low solubility in the electrolyte solution. Therefore, a positive electrode paste for a battery that contains the dispersant of the present disclosure (may be abbreviated as a "positive electrode paste" hereinafter) makes it possible to form a positive electrode that is less likely to elute the dispersant (copolymer) into the electrolyte solution. As a result, it is possible to obtain a battery in which the resistance increase rate due to repeated charging and discharging is reduced. The constitutional unit c may be of one type or a combination of two or more types.

A specific example of a monomer that forms the constitutional unit c (also referred to as a "monomer c" hereinafter) is acrylamide (AAm) or methacrylamide (MAAm).

The content of the constitutional unit c in all the constitutional units of the dispersant according to the present disclosure is preferably 3% by mass or more, more preferably 5% by mass or more, further preferably 10% by mass or more, even more preferably 15% by mass or more, still more preferably 18% by mass or more, and yet more preferably 20% by mass or more from the viewpoint of suppressing the dissolution of the dispersant in an electrolyte solution and the solubility of the dispersant in a solvent (also referred to as a "polymerization solvent" hereinafter) used to polymerize the dispersant, and is preferably 45% by mass or less, more preferably 40% by mass or less, and further preferably 35% by mass or less from the same viewpoint. From the same viewpoint, the content of the constitutional unit c in all the constitutional units of the dispersant according to the present disclosure is preferably 3% by mass to 45% by mass, more preferably 5% by mass to 45% by mass, further preferably 10% by mass to 40% by mass, even more preferably 15% by mass to 40% by mass, still more preferably 18% by mass to 35% by mass, and yet more preferably 20% by mass to 35% by mass. When the constitutional unit c is a combination of two or more types, the content of the constitutional unit c is the total content of the two or more types.

In the present disclosure, the content of the constitutional unit c in all the constitutional units of the dispersant can be considered as the ratio of the amount of the monomer c used to the total amount of the monomers used for polymerization.

From the viewpoint of improving the dispersion stability of the conductive material slurry and improving the dispersibility of the conductive material at a high temperature, the mass ratio of the constitutional unit a to the constitutional unit b (constitutional unit a/constitutional unit b) in all the constitutional units of the dispersant according to the present disclosure is preferably 0.30 or more, more preferably 0.50 or more, further preferably 0.70 or more, and even more preferably 1.00 or more. From the same viewpoint, the mass ratio (constitutional unit a/constitutional unit b) is preferably 2.30 or less, more preferably 2.20 or less, and further preferably 2.10 or less. From the same viewpoint, the mass ratio (constitutional unit a/constitutional unit b) in all the constitutional units of the dispersant according to the present disclosure is preferably 0.30 to 2.30, more preferably 0.50 to 2.20, further preferably 0.70 to 2.10, and even more preferably 1.00 to 2.10.

From the viewpoint of suppressing the dissolution of the dispersant in an electrolyte solution and improving the dispersibility of the conductive material at a high temperature, the mass ratio of the constitutional unit b to the constitutional unit c (constitutional unit b/constitutional unit c) in all the constitutional units of the dispersant according to the present disclosure is preferably 0.50 or more, more preferably 0.60 or more, and further preferably 0.70 or more. From the same viewpoint, the mass ratio (constitutional unit b/constitutional unit c) is preferably 7.00 or less, more preferably 4.00 or less, and further preferably 2.50 or less. From the same viewpoint, the mass ratio (constitutional unit b/constitutional unit c) in all the constitutional units of the dispersant according to the present disclosure is preferably 0.50 to 7.00, more preferably 0.60 to 4.00, and further preferably 0.70 to 2.50.

From the viewpoint of suppressing the dissolution of the dispersant to the electrolyte solution and improving the dispersibility of the conductive material at a high temperature, the total content of the constitutional unit b and the constitutional unit c in all the constitutional units of the dispersant according to the present disclosure is preferably 30% by mass or more, more preferably 45% by mass or more, and further preferably 50% by mass or more. From the same viewpoint, the total content of the constitutional unit b and the constitutional unit c is preferably 75% by mass or less, more preferably 65% by mass or less, further preferably 60% by mass or less, and even more preferably 56% by mass or less. From the same viewpoint the total content of the constitutional unit b and the constitutional unit c in all the constitutional units of the dispersant according to the present disclosure is preferably 30% by mass to 75% by mass, more preferably 45% by mass to 65% by mass, further preferably 45% by mass to 60% by mass and even more preferably 50% by mass to 56% by mass.

The dispersant of the present disclosure may further contain another constitutional unit, which is copolymerizable with the constitutional units a to c, other than the constitutional units a to c. Examples of a monomer that forms a constitutional unit other than the constitutional units a to include (meth)acrylic acid and styrene. The content of the constitutional unit other than the constitutional units a to c in all the constitutional units of the dispersant of the present disclosure is preferably 10% by mass or less, more preferably 6% by mass or less, and further preferably 3% by mass or less.

From the viewpoint of suppressing the dissolution of the dispersant of the present disclosure to the electrolyte solution and improving the dispersibility of the conductive material at a high temperature, the preferred combinations of the constitutional unit a, the constitutional unit b, and the constitutional unit c are as follows. The dispersant contained in the conductive material slurry or the positive electrode paste according to the present disclosure may be of one type or a combination of two or more types of the dispersant that contains the constitutional units a to, for example.

SMA/AN/MAAm
SMA/AN/AAm
SMA/MeAN/MAAm
SMA/MeAN/AAm
SMA/4-Vpy/MAAm
SMA/4-Vpy/AAm
SMA/2-Vpy/MAAm
SMA/2-Vpy/AAm

The arrangement of the constitutional unit a, the constitutional unit b, and the constitutional unit c in the dispersant of the present disclosure can take any form of random, block, or graft.

The weight average molecular weight of the dispersant of the present disclosure is preferably 5000 or more, more preferably 7000 or more, and further preferably 10000 or more from the viewpoint of improving the dispersibility of the conductive materials and the solubility of the dispersant in a polymerization solvent. From the same viewpoint, the weight average molecular weight of the dispersant is preferably 500000 or less, more preferably 200000 or less, and further preferably 100000 or less. From the same viewpoint, the weight average molecular weight of the dispersant of the present disclosure is preferably 5000 to 500000, more preferably 7000 to 200000, and further preferably 10000 to 100000. In the present disclosure, the weight average molecular weight is a value measured by GPC (gel permeation chromatography) and the details of the measurement conditions will be described in Examples.

[Method for Producing Dispersant]

The method for synthesizing the dispersant of the present disclosure is not particularly limited and may be any method that is usually used for the polymerization of (meth)acrylic acid esters and vinyl monomers. Examples of the method for synthesizing the dispersant of the present disclosure include a free radical polymerization method, a living radical polymerization method, an anionic polymerization method, and a living anionic polymerization method. For example, when the free radical polymerization method is used, the dispersant can be obtained by a known method such as solution polymerization of monomer components containing the monomer a, the monomer b, and the monomer c.

Organic solvents such as hydrocarbons (hexane and heptane), aromatic hydrocarbons (toluene, xylene, etc.), lower alcohols (ethanol, isopropanol, etc.), ketones (acetone and methyl ethyl ketone), ethers (tetrahydrofuran and diethylene glycol dimethyl ether), and N-methyl-2-pyrrolidone can be used as the polymerization solvent, for example. N-methyl-2-pyrrolidone that can dissolve a binder during preparation of a positive electrode paste is preferable.

The amount of the polymerization solvent used in the polymerization of the dispersant of the present disclosure is preferably 0.5 to 10 times the total amount of the monomers, which is expressed in mass ratio. The polymerization initiator used in the above polymerization may be any known radical polymerization initiator. Examples of the polymerization initiator include azo polymerization initiators, hydroperoxides, dialkyl peroxides, diacyl peroxides, and ketone peroxides. The amount of the polymerization initiator is preferably 0.01 to 5 mol %, more preferably 0.05 to 4 mol %, and further preferably 0.1 to 3 mol % with respect to the total amount of the monomer components. The polymerization reaction is preferably performed at a temperature of 40° C. to 180° C. under a nitrogen flow, and the reaction time is preferably 0.5 to 20 hours. Moreover, any known chain transfer agent may be used in the above polymerization. Examples of the chain transfer agent include isopropyl alcohol and a mercapto compound such as mercaptoethanol.

[Dispersant Composition]

An aspect of the present disclosure relates to a dispersant composition that contains the dispersant (A) of the present disclosure and a solvent (C1).

<Solvent>

The solvent (C1) is preferably a solvent that is able to dissolve a binder in the preparation of the positive electrode paste. Examples of the solvent (C1) include the following: amide-based polar organic solvents such as dimethylformamide (DMF), diethylformamide, dimethylacetamide (DMAc), and N-methyl-2-pyrrolidone (NMP); alcohols such as methanol, ethanol, 1-propanol, 2-propanol (isopropyl alcohol), 1-butanol (n-butanol), 2-methyl-1-propanol (isobutanol), 2-butanol (sec-butanol), 1-methyl-2-propanol (tert-butanol), pentanol, hexanol, heptanol, and octanol; glycols such as ethylene glycol, diethylene glycol, triethylene glycol, propylene glycol, 1,3-propanediol, 1,3-butanediol, 1,5pentanediol, and hexylene glycol; polyhydric alcohols such as glycerin, trimethylolpropane, pentaerythritol, and sorbitol; glycol ethers such as ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether, and tetraethylene glycol monobutyl ether; ketones such as acetone, methyl ethyl ketone, methyl propyl ketone, and cyclopentanone; and esters such as ethyl acetate, γ-butyrolactone, and ε-propiolactone. It is possible to use a mixture of one or more types thereof.

When the binder in the positive electrode paste is PVDF (polyvinylidene fluoride resin), the solvent (C1) is preferably N-methyl-2-pyrrolidone (NMP) from the viewpoint of exhibiting high solubility of the binder.

<<Content of Dispersant (A) in Dispersant Composition>>

The content of the dispersant (A) in the dispersant composition according to the present disclosure is preferably 10% by mass or more, more preferably 15% by mass or more, and further preferably 20% by mass or more from the viewpoint of blending margin in the subsequent process, and preferably 80% by mass or less, more preferably 60% by mass or less, and further preferably 50% by mass or less from the viewpoint of handling during blending in the subsequent process. From the same viewpoint, the content of the dispersant (A) in the dispersant composition of the present disclosure is preferably 10% by mass to 80% by mass, more preferably 15% by mass to 60% by mass, and further preferably 20% by mass to 50% by mass.

[Method for Producing Dispersant Composition]

A method for producing a dispersant composition of the present disclosure includes dissolving, in a solvent (C1), the dispersant (A) and optional components added as needed. The dispersant (A) may be added to a solvent (C1) in a dry state realized by volatilizing the polymerization solvent used in the [Method for producing dispersant]. However, if the polymerization solvent and the solvent (C) are the same, for example, the dispersant (A) may be mixed with another component in the form of a polymer solution in which the dispersant (A) is dissolved in the polymerization solvent.

[Conductive Material Slurry for Battery]

An aspect of the present disclosure relates to a conductive material slurry that contains the dispersant (A) of the present disclosure, carbon material-based conductive materials (D), and a solvent (C2). The conductive material slurry of the present disclosure may contain optionally an organic basic compound (B) (may also be abbreviated as a "compound (B)" hereinafter).

<Carbon Material-Based Conductive Material>

In one or more embodiments, examples of the conductive materials (D) include carbon nanotubes (also referred to as "CNTs" in the following), carbon black, graphite, and graphene. Among them, the conductive materials (D) are preferably at least one selected from carbon black, CNTs, and graphene from the viewpoint of achieving high conductive properties. From the same viewpoint, the conductive materials (D) are more preferably CNTs or graphene. The carbon material-based conductive materials (D) may be of one type or a combination of two or more types.

(Carbon Nanotube)

The average diameter of the CNTs that can be used as the conductive materials (D) is not particularly limited and is preferably 2 nm or more and 100 nm or less, more preferably 3 nm or more and 70 nm or less, and further preferably 5 nm or more and 50 nm or less from the viewpoint of improving the dispersibility of the CNTs and conductivity. In the present disclosure, the average diameter of the CNTs may be measured with a scanning electron microscope (SEM) or an atomic force microscope (AFM).

In the present disclosure, the CNTs mean the whole of a plurality of types of carbon nanotubes. The form of the CNTs used in the production of the conductive material slurry is not particularly limited. For example, a plurality of types of CNTs may be present independently or may be bundled or entangled with each other. Alternatively, a mixture of CNTs having these forms may be used. The CNTs may be a mixture of two or more types of CNTs having different number of layers or different diameters in order to realize good conductive properties and high dispersibility. The CNTs may contain impurities (such as a catalyst and amorphous carbon) derived from the process of producing the CNTs.

Examples of the CNTs that can be used as the conductive materials (D) include the following: NC-7000 (9.5 nm: hereinafter, the number in parentheses indicates the average diameter) and NX7100 (10 nm) manufactured by Nanocyl SA: FT6100 (9 nm), FT-6110 (9 nm). FT-6120 (9 nm), FT-7000 (9 nm), FT-7010 (9 nm), FT-7320 (9 nm), FT-9000 (12.5 nm), FT-9100 (12.5 nm), FT-9110 (12.5 nm), FT-9200 (19 nm), and FT-9220 (19 nm) manufactured by Jiangsu Cnano Technology Ltd.; HCNTs4 (4.5 nm). CNTs5 (7.5 nm), HCNTs5 (7.5 nm), GCNTs5 (7.5 nm), HCNTs10 (15 nm). CNTs20 (25 nm), and CNTs40 (40 nm) manufactured by Cabot Performance Materials (Shenzhen) Co., Ltd.; CTUBE 170 (13.5 nm), CTUBE 199 (8 nm), and CTUBE 298 (10 nm) manufactured by Korea CNT Co., Ltd.; K-Nanos 100P (11.5 nm) manufactured by Korea Kumho Petrochemical Co., Ltd.; CP-1001M (12.5 nm) and BT-1003M (12.5 nm) manufactured by LG Chem; and 3003 (10 nm) and 3021 (20 nm) manufactured by Nano-Tech Port Co., Ltd.

Examples of the combination of two types of CNTs used include the following: a combination of CNTs40 (40 nm) and HCNTs4 (4.5 nm) or HCNTs5 (7.5 nm) from Cabot Performance Materials (Shenzhen) Co., Ltd.; a combination of CNTs40 (40 nm) and GCNTs5 (7.5 nm) from Cabot Performance Materials (Shenzhen) Co., Ltd.: a combination of CNTs40 (40 nm) and FT-7010 (9 nm) from Jiangsu Cnano Technology Ltd.; a combination of CNTs40 (40 nm) and FT-9100 (12.5 nm) from Jiangsu Cnano Technology Ltd.; and a combination of CNTs40 (40 nm) and BT-1003M (12.5 nm) from LG Chem.

(Carbon Black)

Various types of carbon black, including furnace black, channel black thermal black, acetylene black, and Ketjen black, can be used as the conductive materials (D). In addition, common oxidized carbon black and hollow carbon can also be used. In the oxidation treatment of carbon black, carbon black is treated at a high temperature in the air or secondarily treated with, e.g., nitric acid, nitrogen dioxide, or ozone, so that oxygen-containing polar functional groups such as phenol, quinone, carboxyl, and carbonyl groups are directly introduced (covalently bonded) to the surface of carbon. These treatments are generally performed to improve the dispersibility of carbon black. However, in general, the larger the amount of the functional groups introduced, the lower the conductive properties of carbon black. Therefore, carbon black that has not been subjected to the oxidation treatment is preferably used.

As the specific surface area of the carbon black that can be used as the conductive materials (D) becomes larger, the points of contact between carbon black particles are increased, which is advantageous in reducing the internal resistance of an electrode. Specifically, the specific surface area (BET) is determined from the amount of nitrogen adsorption, and is preferably $20 \, m^2/g$ or more and $1500 \, m/g$ or less, more preferably $50 \, m^2/g$ or more and $1000 \, m^2/g$ or less, and further preferably $100 \, m^2/g$ or more and $800 \, m^2/g$ or less.

The primary particle size (diameter) of the carbon black that can be used as the conductive materials (D) is preferably 5 to 1000 nm, and more preferably 10 to 200 nm from the viewpoint of the conductive properties. In the present disclosure, the primary particle size of the carbon black is the average of the particle sizes measured with, e.g., an electron microscope.

(Graphene)

The graphene that can be used as the conductive materials (D) generally refers to a two-dimensional sheet (single-layer graphene) in which $sp^2$-hybridized carbon atoms form a hexagonal honeycomb lattice and that has a thickness of one atom. In the present disclosure, the graphene also includes a flaky substance having a layered structure of single-layer graphene sheets.

The thickness of the graphene that can be used as the conductive materials (D) is not particularly limited and is preferably 100 nm or less, more preferably 50 nm or less, and further preferably 20 nm or less. The size of a graphene sheet in the direction parallel to the graphene layer is not particularly limited. However, the size of the graphene sheet is preferably 0.5 μm or more, more preferably 0.7 μm or more, and further preferably 1 μm or more from the viewpoint of ensuring favorable conductive properties in a positive electrode. Here, the size of a graphene sheet in the direction parallel to the graphene layer means the average of the maximum diameter and the minimum diameter of the graphene sheet when observed in the direction perpendicular to the plane direction of the graphene sheet.

<<Content of Conductive Materials (D) in Conductive Material Slurry>>

The content of the conductive materials (D) in the conductive material slurry of the present disclosure is preferably 1% by mass or more, more preferably 2% by mass or more, and further preferably 3% by mass or more from the viewpoint of improving the convenience of adjusting the concentration of the positive electrode paste. Furthermore, the content of the conductive materials (D) is preferably 10% by mass or less, more preferably 7% by mass or less, and further preferably 6% by mass or less from the viewpoint of making the viscosity of the conductive material slurry suitable for easy handling. From the same viewpoint, the content of the conductive materials (D) in the conductive material slurry of the present disclosure is preferably 1% by mass to 10% by mass, more preferably 2% by mass to 7% by mass, and further preferably 3% by mass to 6% by mass.

<<Content of Dispersant (A) in Conductive Material Slurry>>

The content of the dispersant (A) in the conductive material slurry of the present disclosure is preferably 0.1 part by mass or more, more preferably 1 part by mass or more, and further preferably 5 parts by mass or more with respect to 100 parts by mass of the conductive materials (D) from the viewpoint of improving the dispersibility of the conductive materials (D). Furthermore, from the viewpoint of high conductive properties, the content of the dispersant (A) is preferably 200 parts by mass or less, more preferably 100 parts by mass or less, and further preferably 50 parts by mass or less with respect to 100 parts by mass of the conductive materials (D). From the same viewpoint, the content of the dispersant (A) in the conductive material slurry of the present disclosure is preferably 0.1 to 200 parts by mass, more preferably 1 to 100 parts by mass, and further preferably 5 to 50 parts by mass with respect to 100 parts by mass of the conductive materials.

<Organic Basic Compound>

In one or more embodiments, examples of the organic basic compound (B) include alkylamines, amino group-containing alcohols, imidazoles, and piperazines.

Alkylamines are preferably primary to tertiary amines having a branched or linear alkyl group or an alicyclic group, and more preferably have an alkyl group such that the total number of carbon atoms in its molecule is 15 or less. Specific examples thereof include hexylamine, octylamine, diethylamine, dibutylamine, trimethylamine, triethylamine, tributylamine, N-propylethylamine, N-butylethylamine, and N,N-dimethylcyclohexylamine. Further, the alkyl group may undergo substitution with an amino group, and in this case, two or more primary to tertiary amino groups are contained. Examples thereof include diamines and triamines such as ethylenediamine and diethylenediaminetriamine. Primary and secondary amines are more preferable. Diethylamine, dibutylamine, hexylamine, and octylamine are preferable.

Amino group-containing alcohols are preferably compounds in which hydrogen of an alkyl group of an alkylamine is replaced by OH, and examples thereof include monoethanolamine, diethanolamine, triethanolamine, N-butyldiethanolamine, N,N-dimethylaminoethanol, N-n-butylethanolamine, 2-(methylamino)ethanol, N-methylethanolamine, N-ethylethanolamine, 2-amino-1-propanol, 2-amino-2-methyl-1-propanol, 1-amino-2-propanol, 2-amino-1,3-propanediol, and diethanolamine.

Examples of imidazoles include 1,2-dimethylimidazole, 2-methylimidazole, 2-ethyl-4-methylimidazole, 4-ethyl-2-methylimidazole, and 1-methyl-4-ethylimidazole.

Examples of piperazines include piperazine, 1-methylpiperazine, 1-ethylpiperazine, 1-propylpiperazine, 1,4-dimethylpiperazine, 1,4-diethylpiperazine, 1,4-dipropylpiperazine, 2-methylpiperazine, 2-ethylpiperazine, 3-propylpiperazine, 2,6-dimethylpiperazine, 2,6-diethylpiperazine, 2,6-dipropylpiperazine, 2,5-dimethylpiperazine, 2,5-diethylpiperazine, and 2,5-dipropylpiperazine.

The compound (B) may be contained in a conductive material slurry or added during preparation of the later described positive electrode paste.

<<Content of Compound (B) in Conductive Material Slurry>>

The content of the compound (B) in the conductive material slurry of the present disclosure is preferably 0.5 part by mass or more, more preferably 1.0 part by mass or more, and further preferably 5 parts by mass or more from the viewpoint of improving the dispersibility of the conductive materials (D), and preferably 200 parts by mass or less, more preferably 100 parts by mass or less, and further preferably 50 parts by mass or less from the viewpoint of high conductive properties, with respect to 100 parts by mass of the conductive materials (D). From the same viewpoint, the content of the compound (B) is preferably 0.5 to 200 parts by mass, more preferably 1.0 to 100 parts by mass, and further preferably 5 to 50 parts by mass with respect to 100 parts by mass of the conductive materials (D).

In the present disclosure, the viscosity of the conductive material slurry at 25° C. is preferably as low as possible. When the content of the conductive materials (D) is 5% by mass, e.g., the viscosity of the conductive material slurry at 25° C. is preferably 0.01 Pa·s or more, more preferably 0.05 Pa·s or more, and further preferably 0.1 Pa·s or more from the viewpoint of sedimentation properties or the like of the conductive material (D). Furthermore, when the content of the conductive materials (D) is 5% by mass, the viscosity of the conductive material slurry at 25° C. is preferably 10 Pa·s or less, more preferably 5 Pa·s or less, and further preferably 2 Pa·s or less from the viewpoint of improving the handleability in the preparation of the positive electrode paste.

[Method for Producing Conductive Material Slurry for Battery]

In one or more embodiments, the conductive material slurry of the present disclosure may be prepared by mixing the dispersant (A), the conductive materials (D), the solvent (C2), and optionally the compound (B), and dispersing their components, with a mixing and dispersing machine. Examples of the solvent (C2) preferably include the same solvent (C1) that can be used for the preparation of the dispersant composition of the present disclosure.

The mixing and dispersing machine may be at least one selected from, e.g., an ultrasonic homogenizer, a vibration mill, a jet mill, a ball mill, a bead mill, a sand mill, a roll mill, a homogenizer, a high-pressure homogenizer, an ultrasonic device, an attritor, a dissolver, and a paint shaker. However, medium stirring type dispersing machines such as a ball mill, a bead mill, and a sand mill are preferable for the reason of dispersion uniformity.

A medium stirring type dispersing machine provides the beads with rotational movement in a grinding chamber and makes an object finer by collision and shearing force between beads, but heat is generated at that time. Although glass, alumina, and zirconia are mainly used for the bead material, zirconia is preferable from the viewpoint of the hardness of beads and avoiding contamination of the slurry with impurities. Regarding the particle size of the beads, a large particle size is preferable for a large object, and a small particle size is preferable for a finer target particle size. Beads with a particle size of 0.1 mm to 20 mm are preferable for dispersing conductive materials. The amount of beads introduced into the grinding chamber, i.e., the filling percentage, is preferably 50% to 90% to the volume of the grinding chamber, and preferably 60% to 80% from the viewpoint of dispersion efficiency and heat generation. The rotational movement provided to the beads, i.e., the circumferential speed, is 5 m/s or more, and preferably 7 m/s or more from the viewpoint of dispersion efficiency, and 16 m/s or less, and preferably 14 m/s or less from the viewpoint of heat generation. The conductive material slurry is fed from a tank to a dispersing machine via a pump, dispersed by beads that are stirred at a high speed, and returned to the tank. The slurry is circulated by repeating this process, and thus the conductive materials can be dispersed. In one aspect, the method for producing a conductive material slurry for a battery according to the present disclosure includes forming a slurry by dispersing components of the mixture that contains the dispersant (A), the conductive materials (D), the solvent (C2), and optionally the compound (B), using a medium stirring type dispersing machine. In this process, the mixture (a coarse dispersion), which is being dispersed, is subjected to the dispersion treatment by feeding the mixture from the medium stirring type dispersing machine to a container (the tank) and feeding the coarse dispersion from the tank to the medium stirring type dispersing machine via the pump, and this dispersion treatment is repeated multiple times to obtain a conductive material slurry for a battery.

In the method for producing a conductive material slurry according to the present disclosure, some of the constituent components of the conductive material slurry may be mixed first, and then the mixture may be blended with the remainder. Moreover, all the components of the conductive material slurry do not have to be added at once, but may be divided and added multiple times. The conductive materials (D) may be prepared in a dry state and mixed with the other components, or mixed with the solvent (C2) and then mixed with the other components. Preferably, the solvent (C2) may be the same as the solvent (C1) described above.

[Positive Electrode Paste for Battery]

An aspect of the present disclosure relates to a positive electrode paste for a power storage device that contains the dispersant (A) of the present disclosure, a solvent (C3), the conductive materials (D), a positive electrode active material, and a binder. The positive electrode paste of the present disclosure further contains optionally the organic basic compound (B). Preferably, the solvent (C3) may be the same as the polymerization solvent or the solvent (C1) described above. In one or more embodiments, the positive electrode paste of the present disclosure contains the dispersant composition of the present disclosure or the conductive material slurry of the present disclosure. The positive electrode paste of the present disclosure is prepared using the conductive material slurry of the present disclosure that contains the dispersant (A), which has low solubility in the electrolyte solution, can suppress an increase in the viscosity of the slurry even when the temperature of the slurry is high during preparation of the conductive material slurry, and realizes favorable dispersion of the conductive materials through the suppression of a viscosity increase. Therefore, it is possible to realize a low volume resistance value and a high discharge capacity retention percentage of the positive electrode for a battery formed using the positive electrode paste of the present disclosure.

Preferred embodiments of the dispersant (A), the solvent (C3), the conductive materials (D), the dispersant composition, and the conductive material slurry are as described above. In one or more embodiments, the positive electrode paste of the present disclosure may further contain conductive materials other than the carbon material-based conductive materials (D). The conductive materials other than the carbon material-based conductive materials (D) include, e.g., conductive polymers such as polyaniline.

<Positive Electrode Active Material>

The positive electrode active material may be any inorganic compound such as a compound with an olivine structure or a lithium transition metal composite oxide. Examples of the compound with an olivine structure include compounds represented by the general formula $Li_xM1_sPO_4$ (where M1 represents a 3d transition metal, $0 \le x \le 2$, and $0.8 \le s \le 1.2$). The compound with an olivine structure may be coated with, e.g., amorphous carbon. Examples of the lithium transition metal composite oxide include a lithium manganese oxide with a spinel structure and a lithium transition metal composite oxide that has a layered structure and is represented by the general formula $Li_xMO_2-\delta$ (where M represents a transition metal, $0.4 \le x \le 1.2$, and $0 \le \delta \le 0.5$). The lithium transition metal composite oxide may further contain one or more than one element selected from Al, Mn, Fe, Ni, Co, Cr, Ti, Zn, P, and B. The transition metal M may be, e.g., Co, Ni, or Mn.

<<Content of Positive Electrode Active Material in Positive Electrode Paste>>

The content of the positive electrode active material in the positive electrode paste of the present disclosure is not particularly limited as long as it can be adjusted in accordance with a suitable viscosity of the positive electrode paste that is applied to a current collector. The content of the positive electrode active material is preferably 40% by mass to 90% by mass, more preferably 50% by mass to 85% by mass, and further preferably 70% by mass to 80% by mass from the viewpoint of the energy density and the stability of the positive electrode paste.

The content of the positive electrode active material in the total solid content of the positive electrode paste of the present disclosure is not particularly limited and may be the same as that of a positive electrode active material in the total solid content of a conventionally known positive electrode paste. The content of the positive electrode active material in the total solid content of the positive electrode paste is preferably 90.0% by mass or more in order to maintain the energy density of the battery at a high level, and is also preferably 99.9% by mass or less in order to ensure the conductive properties and coating properties of a positive electrode composite layer. From the same viewpoint, the content of the positive electrode active material in the total solid content of the positive electrode paste is preferably 90.0% by mass to 99.9% by mass.

<Binder (Binder Resin)>

The binder (binder resin) may be, e.g., polyvinylidene fluoride (PVDF), a vinylidene fluoride-hexafluoropropylene copolymer, styrene-butadiene rubber, or polyacrylonitrile. These materials may be used alone or in combination of two or more.

<<Content of Binder in Positive Electrode Paste>>

The content of the binder in the positive electrode paste of the present disclosure is preferably 0.05% by mass or more from the viewpoint of the coating properties of the positive electrode composite layer and the binding properties of the positive electrode composite layer to a current collector. Furthermore, the content of the binder is preferably 10% by mass or less from the viewpoint of maintaining the energy density of the battery at a high level.

<<Content of Dispersant (A) in Positive Electrode Paste>>

The content of the dispersant (A) in the positive electrode paste of the present disclosure is preferably 0.01% by mass to 2.0% by mass, more preferably 0.03% by mass to 1.0% by mass, and further preferably 0.05% by mass to 0.5% by mass from the viewpoint of reducing the resistance of the positive electrode composite layer.

<<Content of Compound (B) in Positive Electrode Paste>>

The content of the compound (B) in the positive electrode paste of the present disclosure is preferably 0.012% by mass or more, and more preferably 0.02% by mass or more from the viewpoint of increasing the solid content concentration of the positive electrode paste and reducing the viscosity of the positive electrode paste. Furthermore, the content of the compound (B) is preferably 0.2% by mass or less, and more preferably 0.1% by mass or less from the viewpoint of the solubility of the compound (B) in a solvent (C3) and the stability of the positive electrode paste. The compound (B) may be contained in a conductive material slurry or may be added when a later described positive electrode paste is produced.

<<Content of Carbon Material-Based Conductive Materials (D) in Positive Electrode Paste>>

The content of the conductive materials (D) in the positive electrode paste of the present disclosure is preferably 0.01% by mass or more, more preferably 0.05% by mass or more, and further preferably 0.1% by mass or more from the viewpoint of the conducive properties of the positive electrode composite layer. Furthermore, the content of the conductive materials (D) is preferably 5% by mass or less, more preferably 3% by mass or less, and further preferably 2% by mass or less from the viewpoint of maintaining the energy density of the battery at a high level.

In one or more embodiments, the positive electrode paste of the present disclosure can be produced by mixing the positive electrode active material, the conductive material slurry of the present disclosure, the binder (binder resin), and a solvent (additional solvent) for adjusting the solid content or the like, and then stirring the mixture. Moreover, the mixture may further contain a dispersant, a functional material, or the like. Examples of the solvent (additional solvent) include non-aqueous solvents such as N-methyl-2-pyrrolidone (NMP), dimethylformamide (DMF), and dimethyl sulfoxide (DMSO) and water. In the production of the positive electrode paste of the present disclosure, the solvent (additional solvent) is preferably a non-aqueous solvent, and more preferably NMP. In one or more embodiments of the positive electrode paste of the present disclosure, the solvent (additional solvent) and the solvent (C2) contained in the conductive material slurry form a solvent (C3) forming the positive electrode paste of the present disclosure. For example, a planetary mixer, a bead mill, or a jet mill can be used, optionally in combination, for mixing and stirring.

The positive electrode paste of the present disclosure can also be prepared by premixing some of the components that are used to produce the positive electrode paste, and then blending the mixture with the remainder. Moreover, all the components of the positive electrode paste do not have to be added at once, but may be divided and added multiple times. This can reduce the mechanical load on the stirring device.

The solid content concentration of the positive electrode paste of the present disclosure, the amount of the positive electrode active material, the amount of the binder, the amount of the conductive material slurry, the amount of the additive components, and the amount of the solvent (C3) can be adjusted in accordance with a suitable viscosity of the positive electrode paste that is applied to a current collector. The amount of the solvent (C3) is preferably as small as possible from the viewpoint of drying properties. However, the viscosity of the positive electrode paste should not be too high from the viewpoint of the uniformity and surface smoothness of a positive electrode composite layer. On the other hand, the viscosity of the positive electrode paste should not be too low from the viewpoint of preventing it from drying out and ensuring a sufficient thickness of the positive electrode composite layer.

It is preferable that the positive electrode paste of the present disclosure can be adjusted to a high concentration from the viewpoint of production efficiency. However, a significant increase in the viscosity of the positive electrode paste is not preferred in terms of workability. The addition of additives can maintain a suitable viscosity range while keeping a high concentration of the positive electrode paste.

<Method for Producing Positive Electrode Paste>

A method for producing a positive electrode paste of the present disclosure includes mixing the conductive material, the positive electrode active material, the solvent (additional solvent), the binder, and the dispersant composition of the present disclosure, for example. These components may be mixed in any order. In one or more embodiments, the method for producing a positive electrode paste of the present disclosure includes preferably mixing the conductive material slurry of the present disclosure, the binder, the solvent (additional solvent), and the positive electrode active material. These components may be mixed in any order. Further, in one or more embodiments, the positive electrode paste may also be produced in the following manner. The conductive material slurry of the present disclosure, the additional solvent, and the binder are mixed and dispersed until the mixture becomes homogeneous. Then, this mixture is blended with the positive electrode active material, and stirred until they become homogeneous. The order of adding the components is not limited to the above.

Each of the dispersant composition, the conductive material slurry, and the positive electrode paste of the present disclosure may further contain other components to the extent that they do not interfere with the effects of the present disclosure. The other components include, e.g., an antioxidant, a neutralizer, an antifoaming agent, an antiseptic, a dehydrating agent, an anticorrosive agent, a plasticizer, and a binder.

[Positive Electrode for Battery]

An aspect of the present disclosure relates to a positive electrode for a battery formed by using the positive electrode paste of the present disclosure. In this aspect, the preferred embodiments of the positive electrode paste of the present disclosure are as described above.

The positive electrode is produced by, e.g., applying positive electrode paste to a current collector such as aluminum foil, and then drying the positive electrode paste. In this case, the positive electrode paste may be subjected to compaction with a pressing machine to increase the density of the positive electrode. The positive electrode paste may be applied with, e.g., a die head, a comma reverse roll, a direct roll, or a gravure roll. The applied positive electrode paste may be dried by, e.g., heating, airflow, or infrared radiation, which may be used alone or in combination. The positive electrode can be pressed with, e.g., a roll press machine.

The present application further discloses a dispersant for a positive electrode of a power storage device, use of the dispersant for a positive electrode of a power storage device, a method for producing a conductive material slurry for a battery described below, and the like.

<1> A dispersant for a positive electrode of a power storage device, the dispersant being a copolymer containing a constitutional unit represented by the following formula (1), a constitutional unit represented by the following formula (2), and a constitutional unit represented by the following formula (3).

[Chemical Formula 10]

$$\begin{array}{ccc} & R^1 & R^3 \\ & | & | \\ \underset{}{-}( & C & - & C )- \\ & | & | \\ & R^2 & C=O \\ & & | \\ & & O-R^4 \end{array} \tag{1}$$

In the formula (1), $R^1$, $R^2$, and $R^3$ are the same or different and represent a hydrogen atom, a methyl group, or an ethyl group, and $R^1$ represents a hydrocarbon group having 8 to 30 carbon atoms.

[Chemical Formula 11]

$$\begin{array}{ccc} & R^5 & R^7 \\ & | & | \\ \underset{}{-}( & C & - & C )- \\ & | & | \\ & R^6 & X^1 \end{array} \tag{2}$$

In the formula (2), $R^5$, $R^6$, and $R^7$ are the same or different and represent a hydrogen atom, a methyl group, or an ethyl group, and a functional group $X^1$ is a pyridinyl group, a pyrrolidone group, or a cyano group that may have a hydrocarbon group having 1 to 4 carbon atoms.

[Chemical Formula 12]

$$\begin{array}{ccc} & R^8 & R^{10} \\ & | & | \\ \underset{}{-}( & C & - & C )- \\ & | & | \\ & R^9 & C=O \\ & & | \\ & & NH_2 \end{array} \tag{3}$$

In the formula (3), $R^8$, $R^9$, and $R^{10}$ are the same or different and represent a hydrogen atom, a methyl group, or an ethyl group.

<2> The dispersant for a positive electrode of a power storage device according to <1>, in which the content of the constitutional unit represented by the formula (3) in all the constitutional units of the dispersant for a positive electrode of a power storage device is 20% by mass or more and 35% by mass or less.

<3> The dispersant for a positive electrode of a power storage device according to <1> or <2>, in which the dispersant for a positive electrode of a power storage device has a weight average molecular weight of 5000 or more and 500000 or less.

<4> A dispersant composition containing the dispersant for a positive electrode of a power storage device according to any one of <1> to <3>, an organic basic compound, and a solvent.

<5> A conductive material slurry for a battery that contains the dispersant for a positive electrode of a power storage device according to any one of <1> to <3>, a carbon material-based conductive material, an organic basic compound, and a solvent.

<6> A method for producing a conductive material slurry for a battery, including forming a slurry by dispersing components of a mixture that contains the dispersant for a positive electrode of a power storage device according to any one of <1> to <3>, a carbon material-based conductive material, a solvent, and optionally an organic basic compound, using a medium stirring type dispersing machine, in which a conductive material slurry for a battery is obtained by performing dispersion treatment by feeding the mixture (a coarse dispersion), which is being dispersed, from the medium stirring type dispersing machine to a container (a tank) and feeding the coarse dispersion from the tank to the medium stirring type dispersing machine via a pump, and repeating the dispersion treatment multiple times.

<7> The method for producing a conductive material slurry for a battery according to <6>, in which the mixture that has passed through and is discharged from the medium stirring type dispersing machine has a temperature (outlet temperature) of 50° C. or more.

<8> Use of the dispersant for a positive electrode of a power storage device according to any one of <1> to <3> for producing a conductive material slurry for a battery.

<9> Use of the dispersant for a positive electrode of a power storage device according to any one of <1> to <3> for producing a positive electrode paste for a battery.

Examples

Hereinafter, Examples of the present disclosure and Comparative Examples will be described, but the present disclosure is not limited to the following examples.
1. Method for Measuring Each Parameter
[Measurement of Weight Average Molecular Weight of Polymer]

The weight average molecular weight of the polymer was measured by a GPC method. The detailed conditions are as follows.

Measuring device: HLC-8320 GPC (manufactured by Tosoh Corporation)

Column: α-M+α-M (manufactured by Tosoh Corporation)

Column temperature: 40° C.

Detector: differential refractometer

Eluant: N,N-dimethylformamide (DMF) solution containing 60 mmol/L of $H_3PO_4$ and 50 mmol/L of LiBr Flow rate: 1 mL/min Standard sample used for calibration curve: polystyrene Sample solution: DMF solution containing 0.5 wt % of solid content of copolymer Amount of sample solution injected: 100 μL

[Solubility in Electrolyte Solution]

The dissolution rate of the dispersant in the solvent used for the electrolyte solution was measured in order to confirm the solubility of the dispersant (copolymer) in the electrolyte solution. The obtained copolymer solution was introduced into a Petri dish, and dried under reduced pressure at 140° C. under a nitrogen flow for 12 hours or more. A 10% suspension was prepared by adding 9 g of a mixed solvent of ethylene carbonate and diethylene carbonate (volume ratio 50/50) to 1 g of the obtained copolymer. The obtained suspension was left at 40° C. for 1 hour. Then the suspension was filtered through a 0.5-μm PTFE filter to remove undissolved copolymer. The mass of the copolymer dissolved in the mixed solvent was measured by drying the filtered solution at 140° C. under reduced pressure and a nitrogen flow. The dissolution rate of the copolymer in the mixed solvent was obtained using the following formula as the solubility in the electrolyte solution. The obtained dissolution rates are shown in Table 6.

$$\text{Dissolution rate } (\%) = \frac{\text{Mass (g) of copolymer dissolved in mixesd \quad solvent}}{\text{Mass (g) of copolymer mixed with mixed solvent}} \times 100(\%)$$

[Math 2]

[Measurement of Viscosity of Conductive Material Slurry]

The viscosity of the conductive material slurry at 25° C. and 50° C. was measured at a shear rate of 10 s$^{-1}$ by using a rheometer MCR 302 (manufactured by Anton Paar GmbH) equipped with a cone plate CP50. The viscosity of the conductive material slurry after 5 minutes was recorded and is shown in Table 6.
[Measurement of Volume Resistance Value of Positive Electrode Composite Layer]

The positive electrode paste was dropped on a polyester film and applied uniformly to the polyester film with a 100 μm applicator. The coated polyester film was dried at 100° C. for 1 hour, so that a positive electrode composite layer with a thickness of 40 μm was obtained.

The volume resistance value of the positive electrode composite layer was measured at a limiting voltage of 10 V by using Loresta-GP (manufactured by Mitsubishi Chemical Analytech Co., Ltd.) equipped with a PSP probe. Table 6 shows the results.
[Discharge capacity retention percentage]

First, a negative electrode was produced. Specifically, 94.8 parts by mass of graphite that is commercially available for a negative electrode active material, 1.7 parts by mass of acetylene black, 2 parts by mass of SBR (styrene-butadiene rubber), and 1.5 parts by mass of CMC (carboxymethyl cellulose) were mixed together. Subsequently, a slurry was produced by adding distilled water, which is a solvent, to the mixture. The slurry was applied to the surface of an electrodeposited copper foil to a thickness of about 100 μm using a doctor blade, dried at 120° C., and then roll-pressed to produce a negative electrode.

A slurry was produced by mixing a positive electrode active material (NCM523 manufactured by Nippon Chemical Industrial Co., Ltd.), polyvinylidene fluoride (PVDF), CNT (GCNTs5 manufactured by Cabot Performance material (Shenzhen)), each copolymer shown in Table 2, and the compound B with NMP, which is an organic solvent, at a weight ratio of 97:2:1:0.225:0.025. A positive electrode was produced by applying the slurry to both surfaces of an aluminum foil with a thickness of 20 μm, and drying the slurry.

Also, the electrolyte solution was prepared by dissolving 1 M of $LiPF_6$ as a solute in a non-aqueous organic solvent in which ethylene carbonate (EC) and diethyl carbonate (DEC) were mixed together at a weight ratio of 1:1.

A coin battery was produced using the negative electrode, the positive electrode, and the electrolyte solution produced in this manner, and battery properties (rate properties 5 C) were measured. Specifically, the battery was charged at 0.2 C to 4.2V in an environment at 25° C. under the following conditions and then discharged at 0.2 C to 3V, to obtain discharge capacity. Then, the discharge capacity at 5 C was obtained in the same manner, and the discharge capacity retention percentage at 5 C was obtained based on the discharge capacity at 0.2 C.

<Charge Conditions>

0.2 C CC-CV4.2V(0.02 C Cut of

<Discharge Conditions>

0.2, 0.5, 1, 3, 4, 5, 10 C CC(3V Cut off)

Discharge capacity retention percentage (%) at 5
C=(discharge capacity at 5 C/discharge capacity
at 0.2 C)×100

2. Synthesis of Copolymer

[Raw Materials Used]

The details of raw materials used for synthesis of copolymers are described as follows and shown in Tables 1 and 2.

(Monomer a)

SMA: stearyl methacrylate (manufactured by Shin-Nakamura Chemical Co., Ltd., product number: NK-Ester S)

BeMA: behenyl methacrylate (manufactured by NOF Corporation, product number: BLEMMER VMA)

(Monomer b)

AN: acrylonitrile (manufactured by Fujifilm Wako Pure Chemical Corporation)

4-VPy: 4-vinylpyridine (manufactured by Tokyo Chemical Industry Co., Ltd.)

(Monomer c)

MAAm: methacrylamide (manufactured by Tokyo Chemical Industry Co., Ltd.)

(Monomer d)

MEMA: methoxyethyl methacrylate (manufactured by Tokyo Chemical Industry Co., Ltd., homopolymer adsorption percentage is 1.5%)

PEG (2) MA: methoxydiethylene glycol methacrylate (manufactured by Shin-Nakamura Chemical Co., Ltd., product number: NK-Ester M-20 G, the average number of added moles of ethylene oxide=2)

(Organic Basic Compound)

Octylamine (FARMIN 08D manufactured by Kao Corporation)

(Polymerization Initiator)

V-65B: 2,2'-azobis(2,4-dimethylvaleronitrile) (manufactured by Fujifilm Wako Pure Chemical Corporation)

(Solvent)

NMP N-methyl-2-pyrrolidone (manufactured by Fujifilm Wako Pure Chemical Corporation)

TABLE 1

| Constitutional unit | | Monomer | Formula (1) | | Formula (2) | | Formula (3) |
| | | | $R^4$ | $R^1/R^2/R^3$ | $R^5/R^6/R^7$ | $X^1$ | $R^8/R^9/R^{10}$ |
| --- | --- | --- | --- | --- | --- | --- | --- |
| a | $a^1$ | SMA | C18 | $H/H/CH_3$ | | | |
| | $a^2$ | BeMA | C22 | $H/H/CH_3$ | | | |
| b | $b^1$ | AN | | | H/H/H | CN | |
| | $b^2$ | 4-VPy | | | H/H/H | Pyridinyl group | |
| c | $c^1$ | MAAm | | | | | $H/H/CH_3$ |

TABLE 2

| | | Dispersant for positive electrode of power storage device | | | | | | |
| | | Constitutional unit a (% by mass)[1] | | Constitutional unit b (% by mass)[1] | | Constitutional unit c (% by mass)[1] | Constitutional unit d (% by mass)[1] | |
| | Copolymer | SMA | BeMA | AN | 4-VPy | MAAm | MEMA | PEG(2)MA |
| --- | --- | --- | --- | --- | --- | --- | --- | --- |
| Ex. | A | 44 | | 36 | | 20 | | |
| | B | | 44 | 36 | | 20 | | |
| | C | 44 | | 31 | | 25 | | |
| | D | 44 | | 26 | | 30 | | |
| | E | 44 | | | 36 | 20 | | |
| | F | 39 | | 28 | | 33 | | |
| | G | 49 | | 24 | | 27 | | |
| | H | 30 | | 40 | | 30 | | |
| | Q | 30 | | 60 | | 10 | | |
| | P | 65 | | 30 | | 5 | | |
| Comp. | N | 44 | | | | 20 | 36 | |
| Ex. | O | 44 | | 26 | | | | 30 |
| | R | 44 | | | | 30 | | 26 |

TABLE 2-continued

| | | | | Sum of masses of constitutional unit b and | Constitutional/ unit b | Constitutional unit a/ |
| | | Initiator (mol %)[2] | | constitutional | constitutional | constitutional |
| | Copolymer | V-65B | Mw | unit c | unit c | unit b |
|---|---|---|---|---|---|---|
| Ex. | A | 1.6 | 36500 | 56 | 1.80 | 1.22 |
| | B | 1.6 | 34200 | 56 | 1.80 | 1.22 |
| | C | 1.6 | 33300 | 56 | 1.24 | 1.42 |
| | D | 1.6 | 32600 | 56 | 0.87 | 1.69 |
| | E | 1.6 | 28400 | 56 | 1.80 | 1.22 |
| | F | 1.6 | 26900 | 61 | 0.85 | 1.39 |
| | G | 1.6 | 25600 | 51 | 0.89 | 2.04 |
| | H | 1.6 | 31500 | 70 | 1.33 | 0.75 |
| | Q | 1.6 | 27300 | 70 | 6.00 | 0.60 |
| | P | 1.6 | 22700 | 35 | 6.00 | 2.17 |
| Comp. | N | 1.6 | 36900 | 20 | 0.00 | |
| Ex. | O | 1.6 | 28400 | 26 | | 1.69 |
| | R | 1.6 | 30500 | 30 | 0.00 | |

[1]Content in all constitutional units of dispersant (% by mass)
[2]Content to total amount of monomer components (mol %)

[Example of Synthesis of Copolymer A]

The following dropping monomer solutions 1 to 3, and the following dropping initiator solution were produced. The dropping monomer solution was prepared through dilution using NMP in an amount twice the amount of the monomer. Dropping monomer solution 1: a mixed solution containing 44 g of SMA (monomer a[1]) and 88 g of NMP (solvent) Dropping monomer solution 2: a mixed solution containing 36 g of AN (monomer b[1]) and 72 g of NMP (solvent) Dropping monomer solution 3: a mixed solution containing 20 g of MAAm (monomer c[1]) and 40 g of NMP (solvent) Dropping initiator solution: a mixed solution containing 1.6 g of V-65B (polymerization initiator) and 16 g of NMP (solvent)

A separable flask equipped with a reflux tube, an agitator, a thermometer, a nitrogen introduction tube, and a dropping funnel was used. The inside of the flask (vessel) was replaced with nitrogen for 1 hour or more. Then, each of the dropping monomer solutions 1 to 3, and the dropping initiator solution were added dropwise to a flask at 70° C. over 120 minutes. After completion of the dropping, the mixture was stirred for 1 hour while the temperature in the vessel was still maintained at 70° C. Subsequently, the temperature in the flask was raised to 75° C., and the mixture was further stirred for 1 hour. Then, the mixture was diluted with 21 g of NMP (solvent), thereby providing a 30% by mass-solution containing a copolymer A. The copolymer A solution had a non-volatile content of 30.2% by mass and the copolymer A had a weight average molecular weight of 36500.

[Example of Synthesis of Copolymers C, D, F, G, H, Q, and P]

The mass ratios of the monomers used for the synthesis of each of the copolymers C, D, F, G, H, Q, and P in the preparation of the dropping monomer solutions were set to the values shown in Table 2. After completion of polymerization, 30% by mass solutions of the copolymers C, D, F, G, H, Q. and P were obtained through dilution with NMP in the same manner as described in [Example of synthesis of copolymer A].

[Example of Synthesis of Copolymer B]

A 30% by mass solution of the copolymer B was obtained in the same manner as described in [Example of synthesis of copolymer A], except that a mixed solution of 44 g of BeMA (monomer a) and 88 g of NMP (solvent) was used as the dropping monomer solution 1.

[Example of Synthesis of Copolymer E]

A 30% by mass solution of the copolymer E was obtained in the same manner as described in [Example of synthesis of copolymer A], except that a mixed solution of 36 g of 4-VPy (monomer b[2]) and 72 g of NMP (solvent) was used as the dropping monomer solution 2.

[Example of Synthesis of Copolymer N]

A 30% by mass solution of the copolymer N was obtained in the same manner as described in [Example of synthesis of copolymer A], except that a mixed solution of 36 g of MEMA and 72 g of NMP (solvent) was used instead of the dropping monomer solution 2.

[Example of Synthesis of Copolymer O]

A 30% by mass solution of the copolymer O was obtained in the same manner as described in the example of the synthesis of the copolymer D, except that a mixed solution of 30 g of PEG(2)MA and 60 g of NMP (solvent) was used instead of the dropping monomer solution 3.

[Example of Synthesis of Copolymer R]

A 30% by mass solution of the copolymer R was obtained in the same manner as described in the example of the synthesis of the copolymer D, except that a mixed solution of 26 g of PEG(2)MA and 52 g of NMP (solvent) was used instead of the dropping monomer solution 2.

3. Preparation of Conductive Material Slurry

The copolymer shown in Table 2, the conductive material shown in Table 3, the organic solvent (NMP), and optionally the organic basic compound (B) were mixed uniformly, so that the compositions shown in Table 4 were realized. Thus, conductive material slurries were obtained.

Specifically, with regard to the conductive material slurry (2-1), 200 g of a conductive material, 133 g of the copolymer A solution, and 3667 g of NMP (additional solvent) were mixed at room temperature to prepare 4000 g of a coarse dispersion. The obtained coarse dispersion was passed through a medium stirring type dispersing machine (Dyno-Mill model KDL-PILOT 1.4 manufactured by Shimaru Enterprises Corporation) at a flow rate of 300 g/min. Note that the conditions for the dispersing machine were as follows: zirconia beads with an average diameter of 0.5 mm at a filling ratio of 70% and a circumferential speed of 10 m/s. The coarse dispersion that passed through the dispersing machine was collected in a container, and the collected coarse dispersion was fed from the container to the dispersing machine again. The temperature of the dispersion that passed through the dispersing machine and was discharged therefrom reached 50° C. before the dispersion was fed to the dispersing machine again. The dispersion was circulated for 3 hours, and thus the conductive material slurry (2-1) was obtained.

TABLE 3

| Types of conductive materials | Maker | Product name | Size | Specific surface area (m²/g) |
|---|---|---|---|---|
| CNT | Cabot Performance material (Shenzhen) | GCNTs5 | Avg. diameter: 7.5 nm Avg. length: 60 μm Thickness: <10 nm, | 290 |
| Graphene | Cabot Performance material (Shenzhen) | GNS (graphene nanosheet) | Size in direction parallel to graphene layer: 7.5 μm | 500< |

4. Preparation of Positive Electrode Paste

A conductive slurry a positive electrode active material, a binder solution, and NMP (additional solvent) shown in Table 4 were uniformly mixed to realize a composition shown in Table 5, and thus a positive electrode paste was obtained.

Specifically, the conductive material slurry (2-1), NMP (additional solvent), and an NMP solution of PVDF (solid content: 8%. KF polymer L #7208 manufactured by KUREHA CORPORATION, binder solution) were weighed in a 50 ml sample bottle and stirred uniformly with a spatula. Then, this mixture was blended with NCM523 (lithium nickel manganese cobalt oxide, manufactured by Nippon Chemical Industrial Co., Ltd.) as a positive electrode active material, and stirred again with a spatula until they became homogeneous. The resulting mixture was further stirred with a rotation-revolution mixer (AR-100 manufactured by Thinky Corporation) for 10 minutes. Thus, a positive electrode paste was prepared. The mass ratio of the positive electrode active material, the binder (PVDF), the conductive material (carbon nanotubes), and the dispersant was 98.85: 0.5:0.5:0.1 (in terms of solid content). The solid content (%

TABLE 4

| | Conductive material slurry | Dispersant composition | | Content of dispersant with respect to 100 parts by mass of conductive materials (parts by mass) | Conductive materials | | Compound (B) | | Solvent | |
|---|---|---|---|---|---|---|---|---|---|---|
| | | Type | Content of dispersant in dispersant composition (% by mass) | | Type | Content of conductive materials in conductive material slurry (% by mass) | Type | Content of compound (B) with respect to 100 parts by mass of conductive materials (parts by mass) | Type | Content of solvent in conductive material slurry (% by mass) |
| Ex. 1 | 2-1 | Copolymer A | 30 | 20 | CNT | 5 | | | NMP | 94.0 |
| Ex. 2 | 2-2 | Copolymer B | 30 | 20 | CNT | 5 | | | NMP | 94.0 |
| Ex. 3 | 2-3 | Copolymer C | 30 | 20 | CNT | 5 | | | NMP | 94.0 |
| Ex. 4 | 2-4 | Copolymer D | 30 | 20 | CNT | 5 | | | NMP | 94.0 |
| Ex. 5 | 2-5 | Copolymer E | 30 | 20 | CNT | 5 | | | NMP | 94.0 |
| Ex. 6 | 2-6 | Copolymer F | 30 | 20 | CNT | 5 | | | NMP | 94.0 |
| Ex. 7 | 2-7 | Copolymer G | 30 | 20 | CNT | 5 | | | NMP | 94.0 |
| Ex. 8 | 2-8 | Copolymer H | 30 | 20 | CNT | 5 | | | NMP | 94.0 |
| Ex. 9 | 2-10 | Copolymer A | 30 | 20 | CNT | 5 | Octylamine | 10 | NMP | 93.5 |
| Ex. 10 | 2-14 | Copolymer Q | 30 | 20 | CNT | 5 | | | NMP | 94.0 |
| Ex. 11 | 2-13 | Copolymer P | 30 | 20 | CNT | 5 | | | NMP | 94.0 |
| Comp. Ex. 1 | 2-11 | Copolymer N | 30 | 20 | CNT | 5 | | | NMP | 94.0 |
| Comp. Ex. 2 | 2-15 | none | | | CNT | 5 | | | NMP | 95.0 |
| Comp. Ex. 3 | 2-12 | Copolymer O | 30 | 20 | CNT | 5 | | | NMP | 94.0 |
| Comp. Ex. 4 | 2-17 | Copolymer R | 30 | 20 | CNT | 5 | | | NMP | 94.0 |
| Ex. 12 | 2-9 | Copolymer A | 30 | 20 | Graphene | 5 | | | NMP | 94.0 |
| Comp. Ex. 5 | 2-16 | none | | | Graphene | 5 | | | NMP | 95.0 |

The viscosity of the obtained conductive material slurry was measured at 25° C. and 50° C., and the results are shown in Table 6. The larger the difference in viscosity at each temperature, the lower the dispersibility in the dispersing machine. The conductive material slurries (2-2) and onward were prepared in the same manner.

by mass) of the positive electrode paste was 77% by mass. In this case, the solid content of the positive electrode paste refers to a percent by mass of the solid content of the materials contained in the positive electrode paste, including the copolymer, the positive electrode active material, the conductive material, and the binder.

TABLE 5

| | Positive electrode paste | Positive electrode active material Type | Content (% by mass) | Type | Type of dispersant | Content of conductive materials in positive electrode paste (% by mass) | Content of dispersant in positive electrode paste (% by mass) | Content of compound (B) in positive electrode paste (% by mass) | Binder solution Type | Content of binder in positive electrode paste (% by mass) | Solvent Type | Content of solvent in positive electrode paste (% by mass) |
|---|---|---|---|---|---|---|---|---|---|---|---|---|
| Ex. 1 | 3-1 | NCM523 | 76.1145 | 2-1 | Copolymer A | 0.385 | 0.0761 | 0 | PVDF | 0.385 | NMP | 23.04 |
| Ex. 2 | 3-2 | NCM523 | 76.1145 | 2-2 | Copolymer B | 0.385 | 0.0761 | 0 | PVDF | 0.385 | NMP | 23.04 |
| Ex. 3 | 3-3 | NCM523 | 76.1145 | 2-3 | Copolymer C | 0.385 | 0.0761 | 0 | PVDF | 0.385 | NMP | 23.04 |
| Ex. 4 | 3-4 | NCM523 | 76.1145 | 2-4 | Copolymer D | 0.385 | 0.0761 | 0 | PVDF | 0.385 | NMP | 23.04 |
| Ex. 5 | 3-5 | NCM523 | 76.1145 | 2-5 | Copolymer E | 0.385 | 0.0761 | 0 | PVDF | 0.385 | NMP | 23.04 |
| Ex. 6 | 3-6 | NCM523 | 76.1145 | 2-6 | Copolymer F | 0.385 | 0.0761 | 0 | PVDF | 0.385 | NMP | 23.04 |
| Ex. 7 | 3-7 | NCM523 | 76.1145 | 2-7 | Copolymer G | 0.385 | 0.0761 | 0 | PVDF | 0.385 | NMP | 23.04 |
| Ex. 8 | 3-8 | NCM523 | 76.1145 | 2-8 | Copolymer H | 0.385 | 0.0761 | 0 | PVDF | 0.385 | NMP | 23.04 |
| Ex. 9 | 3-10 | NCM523 | 76.1145 | 2-10 | Copolymer A | 0.385 | 0.0761 | 0.0385 | PVDF | 0.385 | NMP | 23.00 |
| Ex. 10 | 3-14 | NCM523 | 76.1145 | 2-14 | Copolymer Q | 0.385 | 0.0761 | 0 | PVDF | 0.385 | NMP | 23.04 |
| Ex. 11 | 3-13 | NCM523 | 76.1145 | 2-13 | Copolymer P | 0.385 | 0.0761 | 0 | PVDF | 0.385 | NMP | 23.04 |
| Comp. Ex. 1 | 3-11 | NCM523 | 76.1145 | 2-11 | Copolymer N | 0.385 | 0.0761 | 0 | PVDF | 0.385 | NMP | 23.04 |
| Comp. Ex. 2 | 3-15 | NCM523 | 76.1145 | 2-15 | none | 0.385 | 0 | 0 | PVDF | 0.385 | NMP | 23.12 |
| Comp. Ex. 3 | 3-12 | NCM523 | 76.1145 | 2-12 | Copolymer O | 0.385 | 0.0761 | 0 | PVDF | 0.385 | NMP | 23.04 |
| Comp. Ex. 4 | 3-17 | NCM523 | 76.1145 | 2-17 | Copolymer R | 0.385 | 0.0761 | 0 | PVDF | 0.385 | NMP | 23.04 |
| Ex. 12 | 3-9 | NCM523 | 76.1145 | 2-9 | Copolymer A | 0.385 | 0.0761 | 0 | PVDF | 0.385 | NMP | 23.04 |
| Comp. Ex. 5 | 3-16 | NCM523 | 76.1145 | 2-16 | none | 0.385 | 0 | 0 | PVDF | 0.385 | NMP | 23.12 |

TABLE 6

| | Dispersant | Evaluation of polymer Solubility in electrolyte solution (%) <0.2 | Conductive material slurry | Conductive material | Organic basic compound | Initial viscosity at 25° C. (Pa · s) | Viscosity at high temperature of 50° C. (Pa · s) | Viscosity difference Δ | Positive electrode paste | Volume resistance value (Ω · cm) | Discharge capacity retention percentage 5 C (%) |
|---|---|---|---|---|---|---|---|---|---|---|---|
| Ex. 1 | Copolymer A | 0.12 | 2-1 | CNT | none | 0.38 | 0.42 | 0.04 | 3-1 | 26 | 78 |
| Ex. 2 | Copolymer B | 0.09 | 2-2 | CNT | none | 0.4 | 0.41 | 0.01 | 3-2 | 25 | 75 |
| Ex. 3 | Copolymer C | 0.09 | 2-3 | CNT | none | 0.33 | 0.52 | 0.19 | 3-3 | 26 | 79 |
| Ex. 4 | Copolymer D | 0.07 | 2-4 | CNT | none | 0.39 | 0.64 | 0.25 | 3-4 | 25 | 77 |
| Ex. 5 | Copolymer E | 0.1 | 2-5 | CNT | none | 0.45 | 0.55 | 0.1 | 3-5 | 27 | 76 |
| Ex. 6 | Copolymer F | 0.05 | 2-6 | CNT | none | 0.6 | 0.66 | 0.06 | 3-6 | 25 | 74 |
| Ex. 7 | Copolymer G | 0.08 | 2-7 | CNT | none | 0.55 | 0.61 | 0.06 | 3-7 | 25 | 74 |
| Ex. 8 | Copolymer H | 0.13 | 2-8 | CNT | none | 0.44 | 0.58 | 0.14 | 3-8 | 26 | 75 |
| Ex. 9 | Copolymer A | 0.12 | 2-10 | CNT | Octylamine | 0.12 | 0.14 | 0.02 | 3-10 | 24 | 78 |
| Ex. 10 | Copolymer Q | 0.3 | 2-14 | CNT | none | 0.65 | 1.35 | 0.7 | 3-14 | 30 | 73 |
| Ex. 11 | Copolymer P | 1.2 | 2-13 | CNT | none | 0.45 | 1.56 | 1.11 | 3-13 | 32 | 76 |
| Comp. Ex. 1 | Copolymer N | 0.12 | 2-11 | CNT | none | 0.59 | 2 | 1.48 | 3-11 | 35 | 75 |
| Comp. Ex. 2 | none | — | 2-15 | CNT | none | 4.95 | 21.5 | 16.55 | 3-15 | 350 | 70 |
| Comp. Ex. 3 | Copolymer O | 3.5 | 2-12 | CNT | none | 0.41 | 0.67 | 0.26 | 3-12 | 36 | 65 |
| Comp. Ex. 4 | Copolymer R | 0.06 | 2-17 | CNT | none | 0.75 | 4.3 | 3.55 | 3-17 | 32 | 65 |
| Ex. 12 | Copolymer A | 0.12 | 2-9 | Graphene | none | 0.25 | 0.26 | 0.01 | 3-9 | 57 | 67 |
| Comp. Ex. 5 | none | — | 2-16 | Graphene | none | 3.3 | 5.3 | 2 | 3-16 | 590 | 73 |

As shown in Table 6, it was found that the difference A between the initial viscosity at 25° C. and the viscosity at 50° C. of the conductive material slurry containing, as dispersants, the copolymers A to H, Q, and P that contained the constitutional unit a, the constitutional unit b, and the constitutional unit c was significantly smaller than that of the conductive material slurry containing, as dispersants, the copolymers N and R that did not contain the constitutional unit b, and the volume resistance value of the former was smaller than or equal to that of the latter. It was found that, regarding the conductive material slurry containing, as a dispersant, the copolymer O that did not contain the constitutional unit c, the viscosity difference A was not large, but its solubility in the electrolyte solution was as high as 3.5%. Therefore, when charging and discharging were repeated, as for battery performance, the volume resistance value increased and the discharge capacity retention percentage decreased.

Furthermore, it was found that the viscosity and the viscosity difference A of the conductive material slurry 2-10 of Example 9 were respectively smaller than the viscosity and the viscosity difference A of the conductive material slurry 2-1 of Example 1, and the dispersibility of the conductive material increased because the compound (B) was contained. It was found that the volume resistance values of Examples in which the content of the constitutional component c in all the constitutional units of the dispersant was 20% by mass to 35% by mass were smaller than those of Examples and Comparative Examples that contained the constitutional units a to c and in which the content of the constitutional component c in all the constitutional units of the dispersant was less than 20% by mass.

INDUSTRIAL APPLICABILITY

The dispersant of the present disclosure can favorably disperse the carbon material-based conductive materials, and thus can reduce the viscosity of the conductive material slurry and the positive electrode paste. Further, the use of the dispersant of the present disclosure in the preparation of the conductive material paste and the positive electrode paste can reduce the viscosity of the conductive material slurry and the positive electrode paste, and can also contribute to a lower resistance of the positive electrode coating.

The invention claimed is:

1. A dispersant for a positive electrode of a power storage device, the dispersant being a copolymer comprising:
    a constitutional unit represented by the following formula (1);
    a constitutional unit comprising at least one monomer selected from the group consisting of 4-vinylpyridine and 2-vinylpyridine; and
    a constitutional unit represented by the following formula (3), wherein

[Chemical Formula 1]

(1)

in the formula (1), $R^1$, $R^2$, and $R^3$ are the same or different and represent a hydrogen atom, a methyl group, or an ethyl group, and $R^4$ represents a hydrocarbon group having 8 to 30 carbon atoms, and

[Chemical Formula 3]

(3)

in the formula (3), $R^8$, $R^9$, and $R^{10}$ are the same or different and represent a hydrogen atom, a methyl group, or an ethyl group, and
wherein:
    a content of the constitutional unit represented by formula (1) in all the constitutional units of the dispersant for a positive electrode of a power storage device is 39% by mass or more and 50% by mass or less;
    a content of the constitutional unit comprising at least one monomer selected from the group consisting of 4-vinylpyridine and 2-vinylpyridine in all the constitutional units of the dispersant for a positive electrode of a power storage device is 24% by mass or more and 38% by mass or less; and
    a content of the constitutional unit represented by formula (3) in all the constitutional units of the dispersant for a positive electrode of a power storage device is 20% by mass or more and 35% by mass or less.

2. A dispersant for a positive electrode of a power storage device, the dispersant being a copolymer comprising:
    a constitutional unit represented by the following formula (1); and
    a constitutional unit represented by the following formula (2); and
    a constitutional unit represented by the following formula (3), wherein

[Chemical Formula 1]

(1)

in the formula (1), $R^1$, $R^2$, and $R^3$ are the same or different and represent a hydrogen atom, a methyl group, or an ethyl group, and $R^4$ represents a hydrocarbon group having 8 to 30 carbon atoms,

[Chemical Formula 2]

(2)

in the formula (2), $R^5$, $R^6$, and $R^7$ are the same or different and represent a hydrogen atom, a methyl group, or an ethyl group, and a functional group $X^1$ is a pyridinyl group or a pyrrolidone group, and

[Chemical Formula 3]

$$\begin{array}{cc} R^8 & R^{10} \\ | & | \\ -\!\!\left(\!C\!-\!C\!\right)\!\!- \\ | & | \\ R^9 & C\!=\!O \\ & | \\ & NH_2 \end{array} \tag{3}$$

in the formula (3), $R^8$, $R^9$, and $R^{10}$ are the same or different and represent a hydrogen atom, a methyl group, or an ethyl group, and wherein:

a content of the constitutional unit represented by formula (1) in all the constitutional units of the dispersant for a positive electrode of a power storage device is 39% by mass or more and 50% by mass or less;

a content of the constitutional unit represented by formula (2) in all the constitutional units of the dispersant for a positive electrode of a power storage device is 24% by mass or more and 38% by mass or less; and a content of the constitutional unit represented by formula (3) in all the constitutional units of the dispersant for a positive electrode of a power storage device is 20% by mass or more and 35% by mass or less.

3. The dispersant for a positive electrode of a power storage device according to claim 2, wherein a mass ratio of the constitutional unit represented by the formula (1) to the constitutional unit represented by the formula (2) is 1.00 or more and 2.10 or less.

4. The dispersant for a positive electrode of a power storage device according to claim 2, wherein a total content of the constitutional unit represented by the formula (2) and the constitutional unit represented by the formula (3) in all the constitutional units of the dispersant for a positive electrode of a power storage device is 45% by mass or more and 60% by mass or less.

5. The dispersant for a positive electrode of a power storage device according to claim 2, wherein the dispersant for a positive electrode of a power storage device has a weight average molecular weight of 5000 or more and 500000 or less.

6. A dispersant composition comprising:

the dispersant for a positive electrode of a power storage device according to claim 2; and a solvent.

7. A conductive material slurry for a battery, comprising:

the dispersant for a positive electrode of a power storage device according to claim 2;

a carbon material-based conductive material; and a solvent.

8. The conductive material slurry for a battery according to claim 7, wherein the carbon material-based conductive material is at least one selected from carbon black, carbon nanotubes, and graphene.

9. A method for producing a conductive material slurry for a battery, comprising dispersing components in a mixture containing the dispersant for a positive electrode of a power storage device according to claim 2, a carbon material-based conductive material, and a solvent, using a ball mill, bead mill, or sand mill.

10. A positive electrode paste for a battery, comprising:

the dispersant for a positive electrode of a power storage device according to claim 2;

a carbon material-based conductive material;

a positive electrode active material;

a binder; and a solvent.

11. A positive electrode for a battery, comprising the dispersant for a positive electrode of a power storage device according to claim 2.

* * * * *